United States Patent
Waxman

(10) Patent No.: US 7,634,015 B2
(45) Date of Patent: Dec. 15, 2009

(54) MOBILE STATION AND METHOD FOR CHANNEL SOUNDING USING A SINGLE RADIO FREQUENCY TRANSMITTER CHAIN IN A MULTIPLE-INPUT MULTIPLE-OUTPUT (MIMO) SYSTEM

(75) Inventor: Shai Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 11/351,932

(22) Filed: Feb. 10, 2006

(65) Prior Publication Data

US 2007/0189408 A1    Aug. 16, 2007

(51) Int. Cl.
*H04L 27/28* (2006.01)
(52) U.S. Cl. ...................................................... 375/260
(58) Field of Classification Search ................. 375/260, 375/267, 299, 347, 349; 700/53; 455/101, 455/132–141
See application file for complete search history.

(56) References Cited

U.S. PATENT DOCUMENTS

2005/0180360 A1    8/2005    Hansen et al.
2005/0181728 A1*   8/2005    Hansen et al. ............. 455/41.2

\* cited by examiner

*Primary Examiner*—Sam K Ahn
(74) *Attorney, Agent, or Firm*—Schwegman, Lundberg & Woessner, P.A.; Gregory J. Gorrie

(57) ABSTRACT

Embodiments of a mobile station and a method for channel sounding in a wireless network are generally described herein. Other embodiments may be described and claimed. In some embodiments, channel sounding is performed using a single radio frequency transmitter chain in a multiple-input multiple-output (MIMO) system. In some embodiments, portions of a channel sounding preamble are serially transmitted on several transmit mobile-station antennas to enable MIMO beamforming by an access point.

30 Claims, 4 Drawing Sheets

MOBILE STATION AND METHOD FOR CHANNEL SOUNDING USING A SINGLE RADIO FREQUENCY TRANSMITTER CHAIN IN A MULTIPLE-INPUT MULTIPLE-OUTPUT (MIMO) SYSTEM

TECHNICAL FIELD

Some embodiments of the present invention pertain to wireless communication networks. Some embodiments relate to wireless local area networks (WLANs). Some embodiments relate to multiple-input multiple-output (MIMO) wireless communications.

BACKGROUND

To enable high-throughput transmission and beamforming by a wireless communication station (e.g., an access point) that uses several transmit antennas, the channel should be fully excited to determine accurate beamforming coefficients. If channel reciprocity is assumed, a mobile station can fully excite the channel with at least as many antennas as the access point will use for transmissions to the mobile station. Fully exciting the channel in this manner may require more complex and expensive high-throughput mobile stations in which each transmit antenna is associated with one chain of radio-frequency (RF) circuitry. Exciting the channel with each transmit antenna may require the use of these several chains which consumes excess energy.

Thus, there are general needs for systems and methods that allow a mobile station to fully excite a channel to enable beamforming by an access point while reducing the complexity and/or cost of the mobile station. There are also general needs for systems and methods that allow a mobile station to fully excite a channel to enable beamforming by an access point while consuming less energy.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
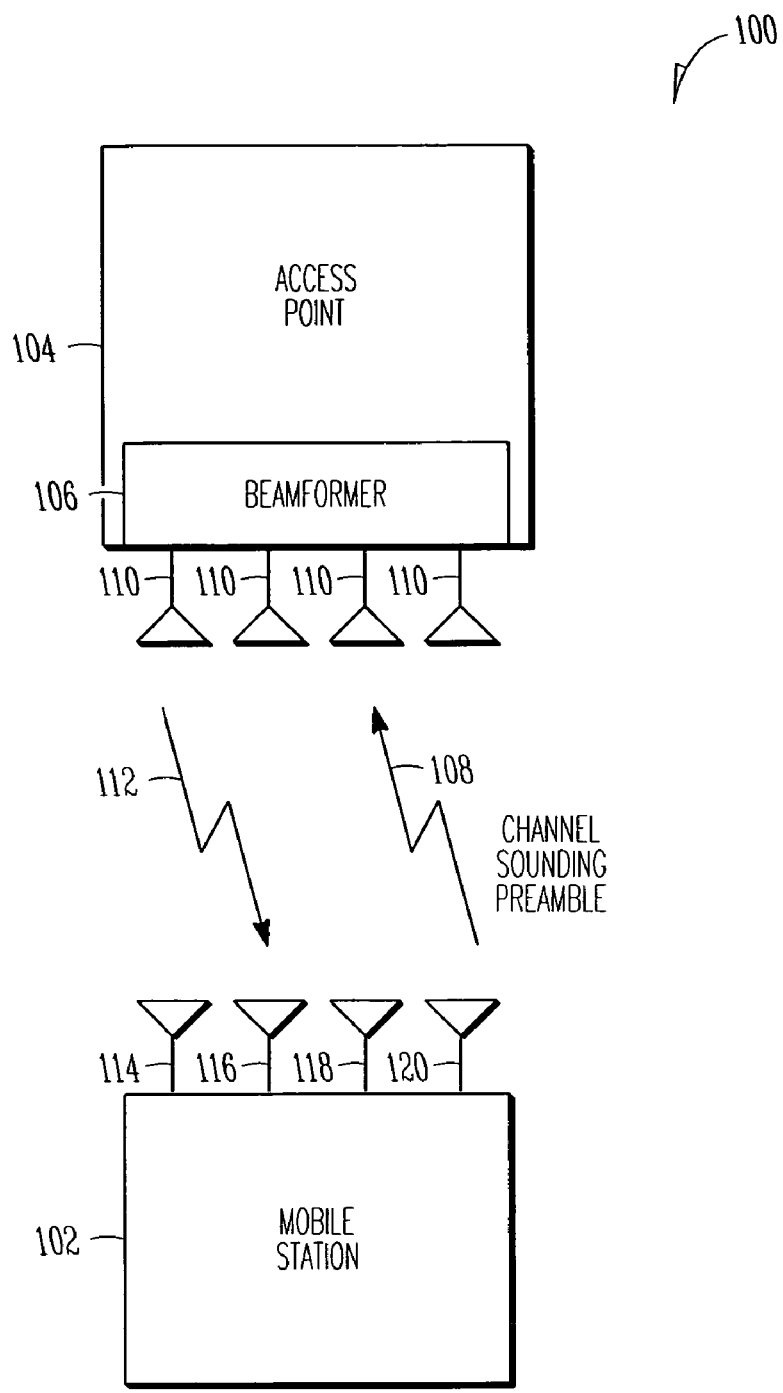
FIG. 1 illustrates a wireless communication network in accordance with some embodiments of the present invention.

FIG. 1 illustrates a wireless communication network in accordance with some embodiments of the present invention. Wireless communication network 100 may include mobile station (MS) 102 and access point (AP) 104. Access point 104 may allow mobile station 102 to communicate with one or more other mobile stations through access point 104 as well as allow mobile station 102 to communicate with external networks, such as the Internet.

In some multiple-input multiple-output (MIMO) embodiments, access point 104 may transmit high-throughput data to mobile station 102 using more than one of access-point antennas, generally shown as antennas 110. In these MIMO embodiments, mobile station 102 may receive the high-throughput data from access point 104 with more than one of mobile-station antennas, generally shown as antennas 114, 116, 118, and 120. In these embodiments, access point 104 may include beamformer 106 to apply beamforming weights to the signals prior to transmission by access-point antennas 110 to take advantage of the particular channel characteristics between access point 104 and mobile station 102. Although FIG. 1 depicts four antennas for each mobile station 102 and access point 104, either mobile station 102 or access point 104 may include more or less antennas.

In some embodiments, access point 104 may perform what may be referred to as implicit beamforming. In these embodiments, access point 104 performs beamforming based on receipt of channel-sounding preamble 108, which may have been transmitted by another station, such as mobile station 102.

In accordance with some embodiments, mobile station 102 may serially transmit different portions of channel-sounding preamble 108 with different mobile-station antennas (e.g., antennas 114, 116, 118, and 120). Channel sounding preamble 108 may be used by access point 104 to subsequently generate and transmit beamformed signals 112 to mobile station 102. The transmission of channel-sounding preamble 108 by more than one of antennas 114, 116, 118, and 120 may fully excite the channel allowing access point 104 to generate accurate beamforming weights. In these embodiments, the serial transmission of different portions of channel-sounding preamble 108 with different mobile-station antennas may allow mobile station 102 to use a single chain of RF transmitter circuitry. These embodiments may reduce power consumption of mobile station 102 and may also reduce the cost and complexity of mobile station 102.

In some embodiments, mobile station 102 and access point 104 may communicate using orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the OFDM signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect.

In some embodiments, the frequency spectrums for the multicarrier communication signals communicated by mobile station 102 and access point 104 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some other embodiments, the frequency spectrum for the multicarrier communication signals communicated by mobile station 102 and access point 104 may comprise frequencies between 2 and 11 GHz, although the scope of the invention is not limited in this respect.

In some embodiments, access point 104 may be a Wireless Fidelity (WiFi) access point or part of a broadband wireless access (BWA) network communication station, such as a Worldwide Interoperability for Microwave Access (WiMax) communication station, although the scope of the invention is not limited in this respect. In some embodiments, mobile station 102 may be part of a WiFi communication device or a BWA network communication station, such as WiMax communication station, although the scope of the invention is not limited in this respect. In some embodiments, mobile station 102 and/or access point 104 may each be part of a portable wireless communication device, such as personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that may receive and/or transmit information wirelessly.

In some embodiments, mobile station 102 and access point 104 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks (WLANs), although the scope of the invention is not limited in this respect as they may also be suitable to transmit and/or receive communications in accordance with other techniques and standards. In some embodiments, mobile station 102 and access point 104 may communicate in accordance with the IEEE 802.16-2004 standard for wireless metropolitan area networks (WMANs) including variations and evolutions thereof (e.g., IEEE 802.16(e)), although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Access-point antennas 110 and mobile-station antennas 114, 116, 118 and 120 may comprise directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In some embodiments, mobile-station antennas 114, 116, 118, and 120 may be effectively separated to take advantage of spatial diversity and the different channel characteristics that may result between each of mobile-station antennas 114, 116, 118, and 120 and access point 104. In some embodiments, mobile-station antennas 114, 116, 118, and 120 may be separated by up to 1/10 of a wavelength or more.

Figure 2:
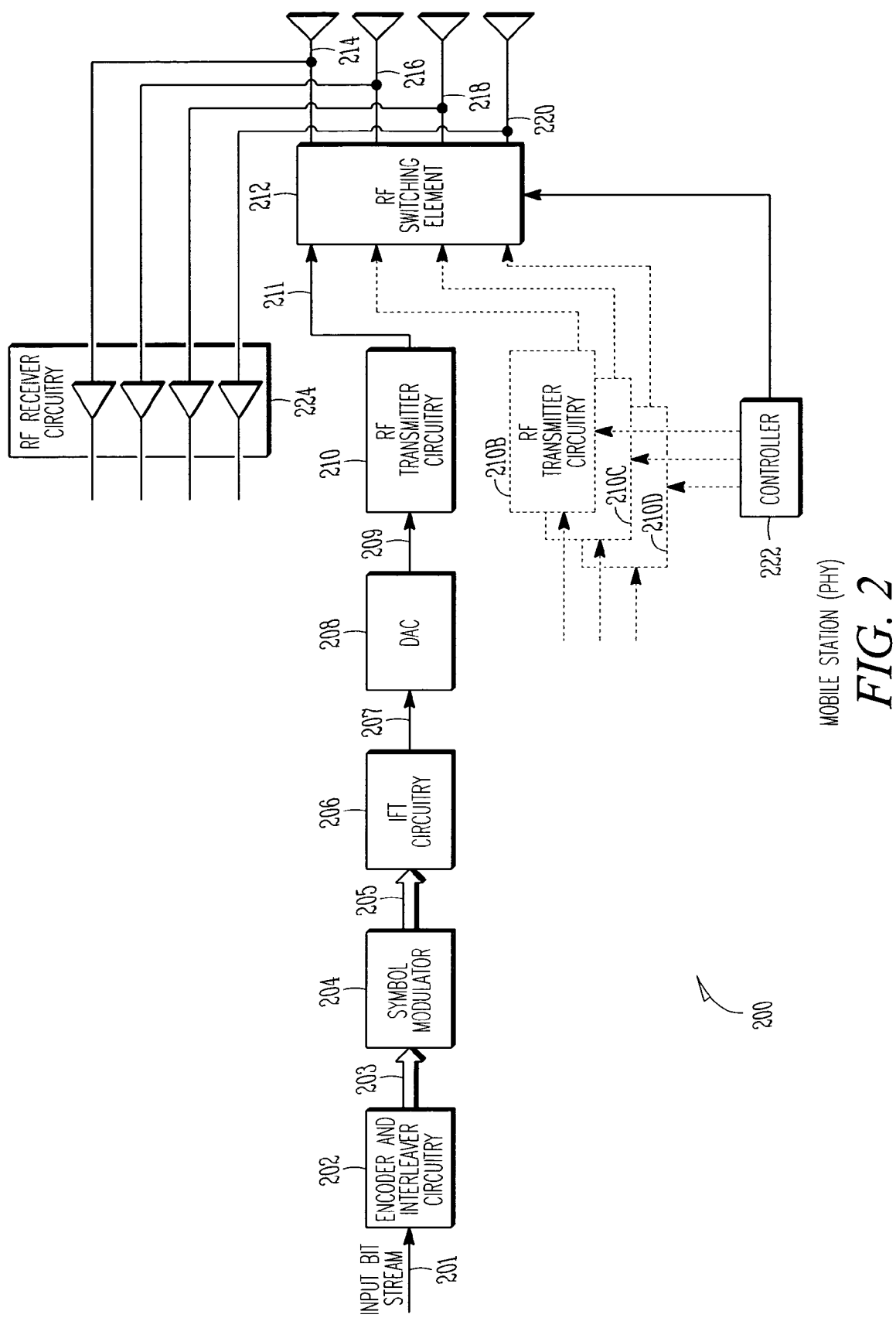
FIG. 2 is a block diagram of a mobile station in accordance with some embodiments of the present invention.

FIG. 2 is a block diagram of a mobile station in accordance with some embodiments of the present invention. Mobile station 200 may be suitable for use as mobile station 102 (FIG. 1) although other mobile station configurations may also be suitable. FIG. 2 illustrates a portion of a physical layer of a mobile station. The physical layer may receive bit stream 201 from a media-access control (MAC) layer and may transmit signals representing bit stream 201 using one or more of mobile-station antennas 214, 216, 218, and 220. Mobile-station antennas 214, 216, 218, and 220 may correspond respectively to mobile-station antennas 114, 116, 118, and 120 (FIG. 1) of mobile station 102 (FIG. 1).

Mobile station 200 may include encoder and interleaver circuitry 202 for performing error-correction encoding and interleaving operations on input bit stream 201. In some embodiments, the error-correction encoding operations may comprise forward-error correcting (FEC) operations while in other embodiments, the error-correction encoding operations may comprise convolutional encoding operations, although the scope of the invention is not limited in this respect. In some embodiments, the interleaving operations may include block interleaving operations, although the scope of the invention is not limited in this respect.

Mobile station 200 may also include symbol modulator 204 to generate one or more subsymbols 205 for each of a plurality of subcarriers from encoded and interleaved bits 203 provided by encoder and interleaver circuitry 202. In some embodiments, symbol modulator 204 may comprise a quadrature-amplitude-modulation (QAM) symbol modulator to generate QAM symbols, although the scope of the invention is not limited in this respect. Subsymbols 205 may comprise digital frequency-domain signals.

Mobile station 200 may also include inverse Fourier transform (IFT) circuitry 206 to perform an inverse Fourier transform on the digital frequency-domain signals provided by symbol modulator 204 to generate digital time-domain signals 207. In some embodiments, IFT circuitry 206 may perform an inverse discrete Fourier transform, such as an inverse fast Fourier transform (IFFT), although the scope of the invention is not limited in this respect.

Mobile station 200 may also include digital-to-analog conversion (DAC) circuitry 208 to convert digital time-domain signals 207 provided by IFT circuitry 206 to analog time-domain signals 209. In some embodiments, analog time-domain signals 209 may be analog baseband signals, although the scope of the invention is not limited in this respect.

Mobile station 200 may also include radio-frequency (RF) transmitter circuitry 210 to upconvert and amplify analog time-domain signals 209 and generate RF time-domain signals 211. RF transmitter circuitry 210 may comprise a single chain of RF transmitter circuitry.

Mobile station 200 may also include RF switching element 212 to selectively provide RF time-domain signals 211 to one or more of mobile-station antennas 214, 216, 218, and 220. In some embodiments, RF switching element 212 may comprise circuitry for switching one or more RF inputs to a plurality of RF outputs. In some embodiments, RF switching element 212 may comprise an RF or microwave switch, such as PIN diode switch, although the scope of the invention is not limited in this respect.

Mobile station 200 may also include RF receiver circuitry 224 to receive signals through mobile-station antennas 214, 216, 218 and 220. In some embodiments, RF receiver circuitry 224 may include a separate RF receiver chain associated with each antenna allowing the signals from each antenna to be downconverted and processed separately before possibly being combined into a single bit stream. Additional circuitry, such as circulators, may be included to allow mobile-station antennas 214, 216, 218 and 220 to be used for both transmission and reception of signals. In some other embodiments, mobile station 200 may comprise one set of mobile-station antennas for transmitting and another set of mobile-station antennas for receiving, although the scope of the invention is not limited in this respect.

In some embodiments, mobile station 200 may comprise additional chains of RF transmitter circuitry, illustrated as RF transmitter circuitries 210B, 210C, and 210D, although the scope of the invention is not limited in this respect. In these embodiments, RF switching element 212 may be configured to selectively couple RF transmitter circuitries 210, 210B, 210C, and 210D to each of mobile-station antennas 214, 216, 218, and 220 allowing the signals from each of RF transmitter circuitries 210, 210B, 210C, and 210D to be transmitted by a corresponding one of mobile-station antennas 214, 216, 218, and 220, although the scope of the invention is not limited in this respect.

In some embodiments, mobile station 200 may also include controller 222 to control RF switching element 212. In some embodiments, controller 222 may also turn-off at least portions of RF transmitter circuitries 210B, 210C, and 210D to reduce power consumption when, for example, RF transmitter circuitry 210 is being used to transmit a channel sounding preamble.

Although mobile station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of mobile station 200 may refer to one or more processes operating on one or more processing elements.

Referring to FIGS. 1 and 2 together, in accordance with some embodiments, RF transmitter circuitry 210 may provide channel-sounding preamble 108 to RF switching element 212 and RF switching element 212 may provide different portions of channel-sounding preamble 108 to different ones of mobile-station antennas 214, 216, 218, and 220 for serial transmission of the different portions to access point 104. In these embodiments, when access point 104 performs beamforming, receiver circuitry 224 may receive beamformed signals 112 transmitted by access point 104 with a plurality of access-point antennas 110. Beamformed signals 112 may be generated based on receipt of the different portions of channel-sounding preamble 108 transmitted by the different ones of mobile-station antennas 214, 216, 218, and 220.

In some embodiments, RF transmitter circuitry 210 may provide time-domain RF signal 211 representing channel-sounding preamble 108 to RF switching element 212, and controller 222 may instruct RF switching element 212 to switch between each of mobile-station antennas 214, 216, 218, and 220 based on durations of the fields of channel-sounding preamble 108. In some embodiments, controller 222 may instruct RF switching element 212 to sequentially switch between mobile-station antennas 214, 216, 218, and 220 according to structure of channel sounding preamble 108 allowing for serial transmissions by each of mobile-station antennas 214, 216, 218, and 220, although the scope of the invention is not limited in this respect.

Figure 3:
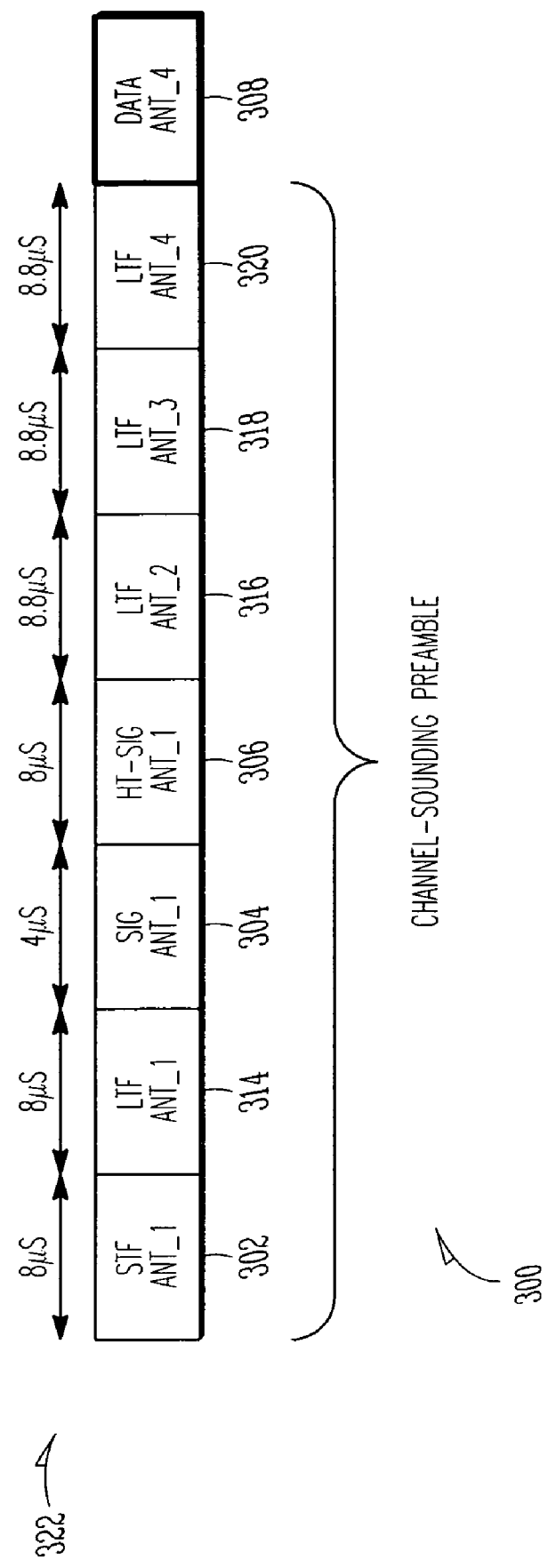
FIG. 3 illustrates a structure of a packet including a channel-sounding preamble and a data field in accordance with some embodiments of the present invention.

FIG. 3 illustrates a structure of a packet including a channel-sounding preamble and a data field in accordance with some embodiments of the present invention. The illustrated packet includes channel sounding preamble 300 which may be followed by data (DATA) filed 308. Channel sounding preamble 300 may correspond to channel sounding preamble 108 (FIG. 1), although other structures for channel sounding preamble 108 may also be suitable.

In some embodiments, channel-sounding preamble 300 comprises short training field (STF) 302, first long training field (LTF) 314, signaling (SIG) field 304, and high-throughput signaling (HT-SIG) field 306 which may be transmitted by first mobile-station antenna 214 (FIG. 2) (i.e., ANT_1). In some embodiments, channel-sounding preamble 300 may further comprise one or more additional long training fields, such as second LTF 316, third LTF 318, and/or fourth LTF 320 which may be transmitted on other mobile-station antennas, such as second mobile-station antenna 216 (i.e., ANT_2), third mobile-station antenna 218 (i.e., ANT_3), and/or fourth mobile-station antenna 220 (FIG. 2) (i.e., ANT_4). In some embodiments, high-throughput signaling field 306 may include a channel-sounding bit, which when set, may indicate to an access point, such as access point 104 (FIG. 1), that channel-sounding preamble 300 is part of the current packet. In some embodiments, the fields of channel-sounding preamble 300 may have durations 322, although the scope of the invention is not limited in this respect as other durations may also be suitable. The example durations 322 of the fields of channel-sounding preamble 300 are shown in microseconds (µS).

Referring to FIGS. 1, 2 and 3 together, in some embodiments, second LTF 316 may be transmitted by second mobile-station antenna 216, third LTF 318 may be transmitted by third mobile-station antenna 218, and fourth LTF 320 may be transmitted by fourth mobile-station antenna 220, although the scope of the invention is not limited in this respect. In some embodiments, STF 302 may comprise repetitions of a short training sequence and may be used by access point 104 for signal detection, automatic gain control (AGC), synchronization, and/or generating an initial frequency-offset estimate. In some embodiments, first LTF 314, second LTF 316, third LTF 318, and fourth LTF 320 may comprise two repetitions of a long training sequence which may be used by access point 104 to estimate channel characteristics and/or to fine tune the initial frequency-offset estimate. In some embodiments, signaling field 304 may indicate a rate and a length of the entire packet which may include channel-sounding preamble 300 and data field 308. High-throughput signaling field 306 may include additional bits for high-through operations and may also include a channel-sounding bit and a cyclic-redundancy check. The channel-sounding bit, when set, may indicate to access point 104 that the current packet includes channel-sounding preamble 300, although the scope of the invention is not limited in this respect.

In some embodiments, fields 302, 304, 314, 316, 318, and 320 may be similar to legacy fields of the IEEE 802.11(n) standard for MIMO communications, although the scope of the invention is not limited in this respect. The embodiments of channel sounding preamble 300 illustrated in FIG. 3 may be referred to as mixed format embodiments (e.g., legacy followed by high-throughput). Some embodiments of the present invention may include other formats, including green-field format embodiments. In some green-field format embodiments, a channel-sounding preamble may include a high-throughput short training field (HT-STF), a first high-throughput long training field (HT-LTF1), a high-throughput signaling field (HT-SIG), a second high-throughput long training field (HT-LTF2), a third high-throughput long training field (HT-LTF3), a fourth high-throughput long training field (HT-LTF4), and/or a high-throughput data field (HT- DATA). The HT-STF and HT-LTF may be similar to legacy STF and LTF although the training sequences may be different. These green-field format embodiments may not necessarily be compatible with some legacy mobile stations.

In some embodiments, a switching rate for RF switching element 212 may be set by controller 222 according to the time required for an AGC loop of the receiver of access point 104 to settle in addition to the duration of LTF 314. In the embodiments illustrated in FIG. 3, LTF 314 is illustrated as having a duration of 8.8 μS; however LTF 314 may have a shorter duration (e.g., 4.8 μS) when LTF 314 comprises a single repetition of a long training sequence, although the scope of the invention is not limited in this respect.

In some embodiments, channel-sounding preamble 300 may be a preamble for an uplink packet that additionally includes data field 308 for transmission by one of the antennas (e.g., fourth mobile-station antenna 220) that may have transmitted the last training field (e.g., fourth LTF 320) of channel-sounding preamble 300. In some embodiments in which four mobile-station antennas are used to transmit channel sounding preamble 300, data field 308 may be transmitted by fourth mobile-station antenna 220 after the transmission of fourth LTF 320 by fourth mobile-station antenna 220, although the scope of the invention is not limited in this respect.

In some embodiments, an access point, such as access point 104, receiving data field 308 may process data field 308 using channel estimates generated from fourth LTF 320, since data field 308 is transmitted using fourth mobile-station antenna 218. On the other hand, when high-throughput data is transmitted using more than one mobile-station antenna, the access point may process the data using the channel estimates generated from more than one long training field.

In some embodiments, LTFs 314, 316, 318 and 320 may use the same frequency subcarriers since they are transmitted serially, rather than concurrently as in some conventional systems, although the scope of the invention is not limited in this respect.

In some embodiments, channel-sounding preamble 300 may be transmitted to access point 104 in response to a channel-sounding request by the access point 104. In some other embodiments, channel-sounding preamble 300 may be part of an acknowledgement (ACK) packet. In these other embodiments, the channel-sounding preamble 300 does not have to be transmitted in response to a request by access point 104 to transmit channel-sounding preamble 300.

In some embodiments, beamformer 106 of access point 102 may generate beamforming weights for each of access-point antennas 110 based on LTFs 314, 316, 318, and 320 of channel-sounding preamble 300. The beamforming weights may comprise a beam-steering matrix which may be used for transmitting high-throughput data with beamformed signals 112 to mobile station 102 using at least two of access-point antennas 110. In some embodiments, the number of access-point antennas 110 used for beamformed signals 112 may be independent of the number of mobile-station antennas used by the mobile station 102 for transmitting LTFs of channel-sounding preamble 300.

In some embodiments, for high-throughput data transmission, controller 222 may instruct RF switching element 212 to couple two or more of the chains of RF transmitter circuitry 210, 210B, 210C, and 210D to a corresponding one of mobile-station antennas 214, 216, 218, and 220. In these embodiments, the chains of RF transmitter circuitries 210, 210B, 210C, and 210D may each provide a portion of the high-through data for concurrent transmission by mobile-station antennas 214, 216, 218, and 220.

In embodiments that include additional RF transmitter circuitry 210B, 210C, and 210D, mobile station 200 may include additional circuitry to generate their input signals for MIMO transmission. This additional circuitry may include encoding and interleaving circuitry, symbol modulation circuitry, IFT circuitry and DAC circuitry for each RF chain, although the scope of the invention is not limited in this respect. In some embodiments, controller 222 may turn-off power to at least portions of the additional chains of RF transmitter circuitries 210B, 210C, and 210D when transmitting the channel-sounding preamble to reduce power consumption.

Figure 4:
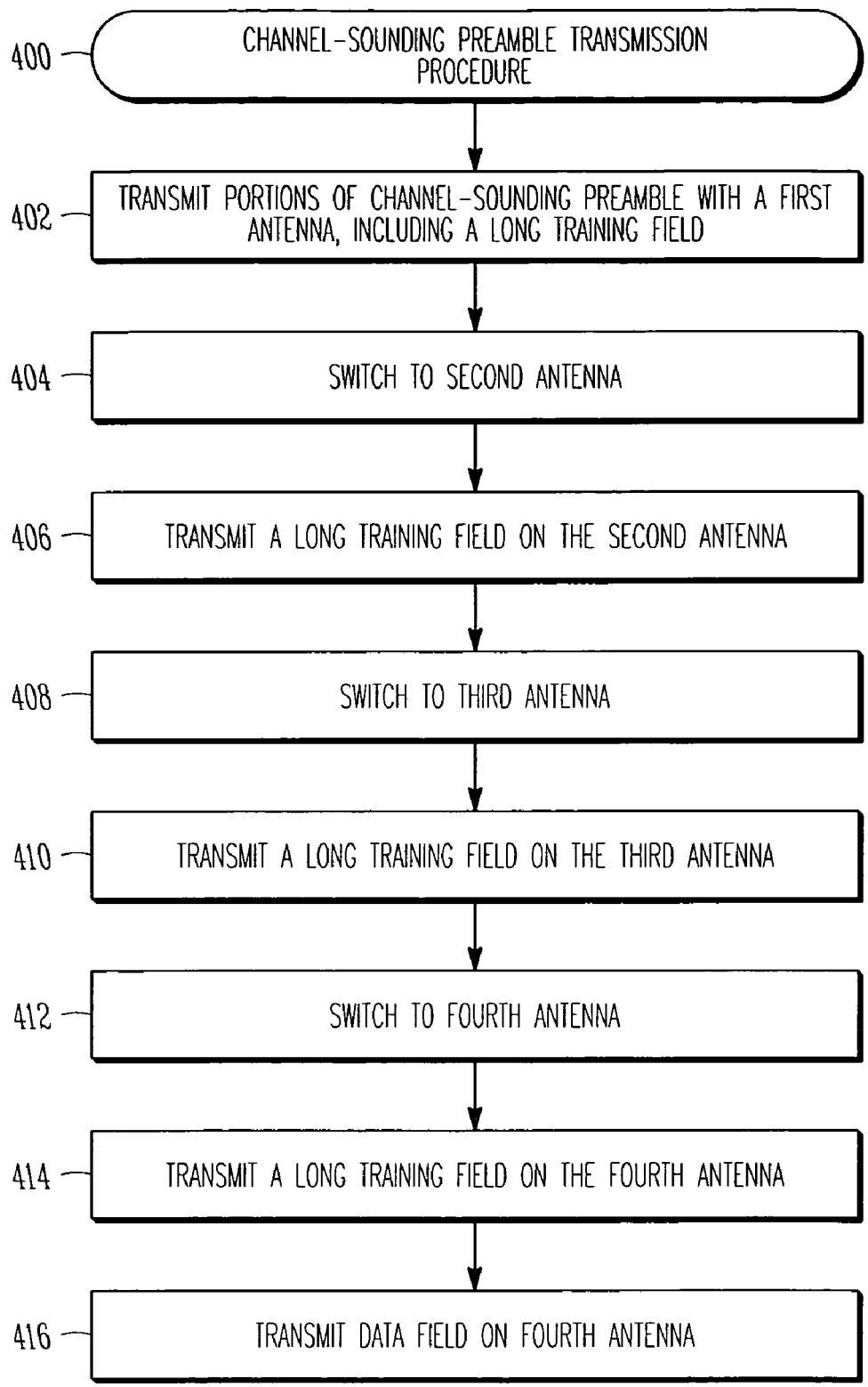
FIG. 4 is a flow chart of a channel-sounding preamble transmission procedure in accordance with some embodiments of the present invention.

FIG. 4 is a flow chart of a channel-sounding preamble transmission procedure in accordance with some embodiments of the present invention. Channel-sounding preamble transmission procedure 400 may be performed by mobile station 200 (FIG. 2) for transmitting a channel-sounding preamble, such as channel sounding preamble 300 (FIG. 3), although other channel-sounding preamble transmission procedures may also be used. Procedure 400 is described for some embodiments of the invention that use four mobile-station antennas for transmitting a channel sounding preamble, although the scope of the invention is not limited in this respect.

Operation 402 comprises transmitting portions of a channel-sounding preamble with a first antenna, including a long training field. The portions of the channel-sounding preamble transmitted by the first antenna may include a short training field, a long training field, a signaling field, and/or a high-throughput signaling field. In some embodiments, operation 402 may be performed by RF transmitter circuitry 210 (FIG. 2) and first mobile-station antenna 214 (FIG. 2).

Operation 404 comprises switching to a second antenna. In some embodiments, operation 404 may be performed by controller 222 (FIG. 2) and RF switching element 212 (FIG. 2). In operation 404, switching element 212 (FIG. 2) may couple the output of RF transmitter circuitry 210 (FIG. 2) to second mobile-station antenna 216 (FIG. 2).

Operation 406 comprises transmitting a long training field of the channel-sounding preamble on the second antenna. In some embodiments, operation 406 may be performed by RF transmitter circuitry 210 (FIG. 2) and second mobile-station antenna 216 (FIG. 2).

Operation 408 comprises switching to a third antenna. In some embodiments, operation 408 may be performed by controller 222 (FIG. 2) and RF switching element 212 (FIG. 2). In operation 408, switching element 212 (FIG. 2) may couple the output of RF transmitter circuitry 210 (FIG. 2) to third mobile-station antenna 218 (FIG. 2).

Operation 410 comprises transmitting a long training field of the channel-sounding preamble on the third antenna. In some embodiments, operation 410 may be performed by RF transmitter circuitry 210 (FIG. 2) and third mobile-station antenna 218 (FIG. 2).

Operation 412 comprises switching to a fourth antenna. In some embodiments, operation 412 may be performed by controller 222 (FIG. 2) and RF switching element 212 (FIG. 2). In operation 412, switching element 212 (FIG. 2) may couple the output of RF transmitter circuitry 210 (FIG. 2) to fourth mobile-station antenna 220 (FIG. 2).

Operation 414 comprises transmitting a long training field of the channel-sounding preamble on the fourth antenna. In some embodiments, operation 402 may be performed by RF transmitter circuitry 210 (FIG. 2) and fourth mobile-station antenna 220 (FIG. 2).

The performance of operations 402 through 414 results in the transmission of portions of a channel sounding preamble using several mobile-station antennas. Operation 416 may be performed when the channel sounding preamble is part of a packet that includes a data field, such as data field 308 (FIG. 3). In operation 416, the data field is transmitted on the fourth antenna. In some embodiments, operation 416 may be performed by RF transmitter circuitry 210 (FIG. 2) and fourth mobile-station antenna 220 (FIG. 2).

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission, or display devices. Furthermore, as used herein, a computing device includes one or more processing elements coupled with computer-readable memory that may be volatile or non-volatile memory or a combination thereof.

Embodiments may be implemented in one or a combination of hardware, firmware, and software. Embodiments may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A mobile station comprising:
    a radio-frequency (RF) switching element;
    RF transmitter circuitry to provide a channel-sounding preamble to the RF switching element, the RF switching element to provide different portions of the channel-sounding preamble to each of a plurality of mobile-station antennas for serial transmission of the different portions to an access point; and
    a controller to instruct the switching element to switch between the mobile-station antennas based on durations of fields of the channel-sounding preamble to provide for the serial transmission of the different portions of the preamble.

2. The mobile station of claim 1 wherein the mobile station further comprises receiver circuitry to receive beamformed signals that were transmitted by the access point with a plurality of access-point antennas to the mobile station, the beamformed signals generated based on receipt of the different portions of the channel-sounding preamble transmitted by the mobile-station antennas.

3. The mobile station of claim 2 wherein the RF transmitter circuitry provides a time-domain (TD) RF signal representing the channel-sounding preamble to the RF switching element.

4. The mobile station of claim 3 wherein the channel-sounding preamble comprises at least one of a short training field, a first long training field, a signaling field, or a high-throughput signaling field for transmission by a first of the mobile-station antennas,
    wherein the channel-sounding preamble further comprises one or more additional long training fields for sequential transmission on corresponding additional ones of the mobile-station antennas, and
    wherein the high-throughput signaling field includes a channel-sounding bit, which when set, indicates that the channel-sounding preamble is part of a current packet.

5. The mobile station of claim 4 wherein the channel-sounding preamble is a preamble for an uplink packet that additionally includes a data field for transmission by one of the mobile-station antennas that transmitted a last field of the channel-sounding preamble.

6. The mobile station of claim 4 where the channel-sounding preamble is transmitted to the access point in response to a channel-sounding request by the access point.

7. The mobile station of claim 4 where the channel-sounding preamble is part of an acknowledgement packet.

8. The mobile station of claim 4 wherein the access point includes a beamformer to generate beamforming weights for each of the access-point antennas based on the long training fields of the channel-sounding preamble for use in transmitting high-throughput data to the mobile station using at least two of the access-point antennas.

9. The mobile station of claim 3 wherein the RF transmitter circuitry comprises a first RF chain of RF transmitter circuitry,
    wherein the mobile station further comprises additional chains of RF transmitter circuitry coupled to the RF switching element, and
    wherein the controller turns-off power to at least portions of the additional chains of RF transmitter circuitry when transmitting the channel-sounding preamble to reduce power consumption.

10. The mobile station of claim 9 wherein for high-throughput data transmission, the controller 222 instructs the RF switching element 212 to couple each of the chains of RF transmitter circuitry to a corresponding one of the mobile-station antennas, and
    wherein the chains of RF transmitter circuitry together provide high-through data for concurrent transmission by the mobile-station antennas.

11. The mobile station of claim 3 wherein the time-domain RF signal comprises an orthogonal frequency division multiplexed (OFDM) signal comprising a plurality of substantially orthogonal subcarriers.

12. A method of exciting a channel performed by a transmitter, the method comprising:
    serially transmitting different portions of a channel-sounding preamble with each of a plurality of mobile-station antennas of a mobile station for use by an access point in transmitting beamformed signals to the mobile station; and switching between the mobile-station antennas based on durations of fields of the channel-sounding preamble to provide for serial transmission of the different portions.

13. The method of claim 12 further comprising receiving beamformed signals that were transmitted by the access point with a plurality of access-point antennas, the beamformed signals generated based on receipt of the different portions of the channel-sounding preamble transmitted by the mobile-station antennas.

14. The method of claim 13 further comprising:
providing a time-domain (TD) RF signal representing the channel-sounding preamble to the RF switching element.

15. The method of claim 14 wherein the channel-sounding preamble comprises at least one of a short training field, a first long training field, a signaling field, or a high-throughput signaling field for transmission by a first of the mobile-station antennas,
wherein the channel-sounding preamble further comprises one or more additional long training fields for sequential transmission on corresponding additional ones of the mobile-station antennas, and
wherein the high-throughput signaling field includes a channel-sounding bit, which when set, indicates that the channel-sounding preamble is part of a current packet.

16. The method of claim 15 wherein the channel-sounding preamble is a preamble for an uplink packet that additionally includes a data field for transmission by one of the mobile-station antennas that transmitted a last field of the channel-sounding preamble.

17. The method of claim 15 where the channel-sounding preamble is transmitted to the access point in response to a channel-sounding request by the access point.

18. The method of claim 15 where the channel-sounding preamble is part of an acknowledgement packet.

19. The method of claim 15 wherein the access point includes a beamformer for generating beamforming weights for each of the access-point antennas based on the long training fields of the channel-sounding preamble for use in transmitting high-throughput data to the mobile station using at least two of the access-point antennas.

20. The method of claim 14 further comprising turning-off power to at least portions of the additional chains of RF transmitter circuitry when transmitting the channel-sounding preamble to reduce power consumption.

21. The method of claim 20 wherein for high-throughput data transmission, the method further comprises:
coupling each of the chains of RF transmitter circuitry to a corresponding one of the mobile-station antennas; and
providing, by the chains of RF transmitter circuitry, high-through data for concurrent transmission by the mobile-station antennas.

22. The method of claim 14 wherein the time-domain RF signal comprises an orthogonal frequency division multiplexed (OFDM) signal comprising a plurality of substantially orthogonal subcarriers.

23. A mobile station system comprising:
two or more substantially omnidirectional mobile-station antennas;
a radio-frequency (RF) switching element coupled to the antennas;
RF transmitter circuitry to provide a channel-sounding preamble to the RF switching element, the RF switching element to provide different portions of the channel-sounding preamble to different one of the mobile-station antennas for serial transmission of the different portions to an access point; and
a controller to instruct the switching element to switch between the mobile-station antennas based on durations of fields of the channel-sounding preamble to provide for the serial transmission.

24. The mobile station system of claim 23 wherein the mobile station further comprises receiver circuitry to receive beamformed signals that were transmitted by the access point with a plurality of access-point antennas to the mobile station, the beamformed signals generated based on receipt of the different portions of the channel-sounding preamble transmitted by the mobile-station antennas.

25. The mobile station system of claim 24 wherein the RF transmitter circuitry provides a time-domain (TD) RF signal representing the channel-sounding preamble to the RF switching element.

26. The mobile station system of claim 25 wherein the channel-sounding preamble comprises at least one of a short training field, a first long training field, a signaling field, or a high-throughput signaling field for transmission by a first of the mobile-station antennas,
wherein the channel-sounding preamble further comprises one or more additional long training fields for sequential transmission on corresponding additional ones of the mobile-station antennas, and
wherein the high-throughput signaling field includes a channel-sounding bit, which when set, indicates that the channel-sounding preamble is part of a current packet.

27. A computer-readable storage medium that stores instructions for execution by one or more processors to cause serial transmission of different portions of a channel-sounding preamble with each of a plurality of mobile-station antennas of a mobile station for use by an access point in transmitting beamformed signals to the mobile station, and
wherein the instructions cause the mobile station to switch between the mobile-station antennas based on durations of fields of the channel-sounding preamble to provide for the serial transmission.

28. The computer-readable storage medium of claim 27 wherein the instructions, when further executed allow the mobile station to receive beamformed signals that were transmitted by the access point with a plurality of access-point antennas, the beamformed signals generated based on receipt of the different portions of the channel-sounding preamble transmitted by the mobile-station antennas.

29. The computer-readable storage medium of claim 28 wherein the instructions, when further executed configure the mobile station to:
provide a time-domain (TD) RF signal representing the channel-sounding preamble to the RF switching element.

30. The computer-readable storage medium of claim 29 wherein the channel-sounding preamble comprises at least one of a short training field, a first long training field, a signaling field, or a high-throughput signaling field for transmission by a first of the mobile-station antennas,
wherein the channel-sounding preamble further comprises one or more additional long training fields for sequential transmission on corresponding additional ones of the mobile-station antennas, and
wherein the high-throughput signaling field includes a channel-sounding bit, which when set, indicates that the channel-sounding preamble is part of a current packet.

* * * * *

UNITED STATES PATENT AND TRADEMARK OFFICE
CERTIFICATE OF CORRECTION

PATENT NO. : 7,634,015 B2  Page 1 of 1
APPLICATION NO. : 11/351932
DATED : December 15, 2009
INVENTOR(S) : Shai Waxman It is certified that error appears in the above-identified patent and that said Letters Patent is hereby corrected as shown below:

In column 10, line 28, in Claim 6, delete "where" and insert -- wherein --, therefor.

In column 10, line 31, in Claim 7, delete "where" and insert -- wherein --, therefor.

In column 11, line 31, in Claim 17, delete "where" and insert -- wherein --, therefor.

In column 11, line 34, in Claim 18, delete "where" and insert -- wherein --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,634,015 B2 Page 1 of 1
APPLICATION NO. : 11/351932
DATED : December 15, 2009
INVENTOR(S) : Shai Waxman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this

Twenty-first Day of December, 2010

David J. Kappos
*Director of the United States Patent and Trademark Office*